Oct. 19, 1965   W. D. LOFTUS   3,213,345
POLARIZED SHORTING FUSE FOR BATTERY CELLS
Filed Sept. 5, 1963
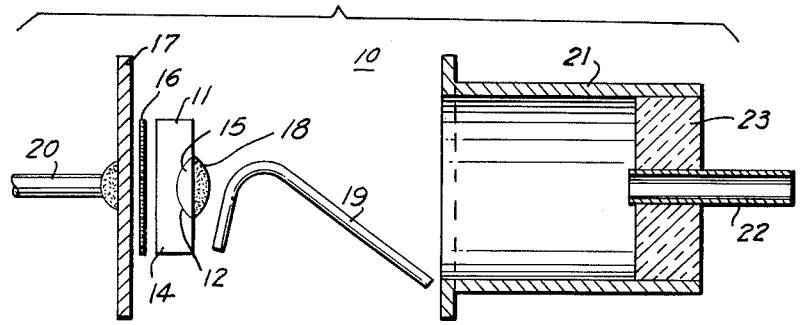
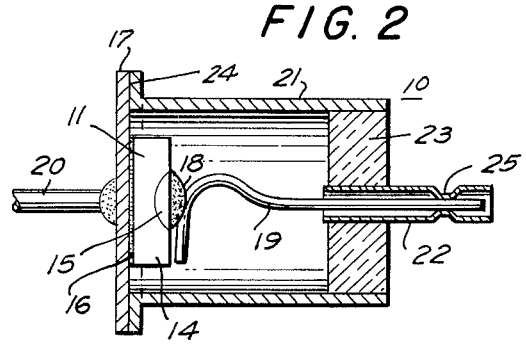
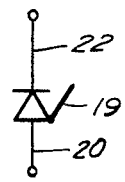
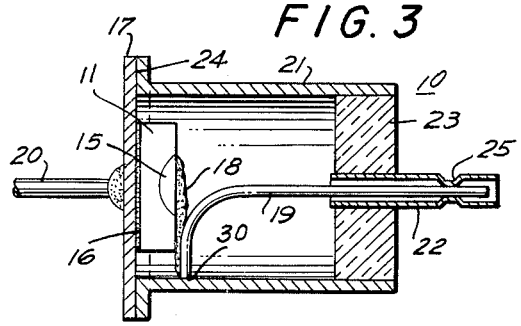
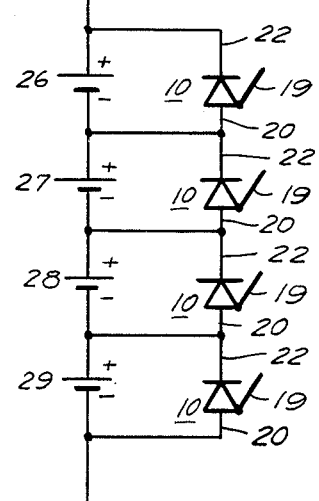
INVENTOR.
WALLACE D. LOFTUS
BY
ATTORNEY

# United States Patent Office 3,213,345
Patented Oct. 19, 1965

3,213,345
POLARIZED SHORTING FUSE FOR
BATTERY CELLS
Wallace D. Loftus, Indianapolis, Ind., assignor to P. R. Mallory & Co., Inc., Indianapolis, Ind., a corporation of Delaware
Filed Sept. 5, 1963, Ser. No. 306,813
7 Claims. (Cl. 320—17)

This invention relates to unidirectional current-responsive switches, and, more particularly, to a polarized shorting fuse for battery cells.

At the present state of the electrical arts, many power requirements are best fulfilled by electro-chemical secondary cells, the individual cells being serially connected to provide higher operating voltages than is obtainable by a single cell. In the interest of low weight and small size, "deep cycling," in other words the removal and restoration of an appreciable part of the battery capacity during a given cycle, is desirable. Unfortunately, conventional rechargeable battery systems are characterized by certain limitation which become more severe with increasing cycle depth. In the first place, it is virtually impossible to produce cells of identically equal capacities and internal resistances. Also, testing and experience have demonstrated that during the life of the cycled battery the individual cell capacities progressively become more diverse.

During the life of the cycled battery, inferior cells may undergo a condition of diminishing capacity until finally the cell of least capacity is not capable of discharging at rate set by the load. This cell will then be subject to forced polarity reversal and in effect will be charged in the reverse direction. Of course, forced polarity reversal cannot be tolerated in a sealed rechargeable cell since it leads to a high voltage drop and electrolyte decomposition with gase formation which can cause catastrophic destruction of the cell and thus of the battery. The problem of forced polarity reversal in cells of rechargeable batteries was well known to those skilled in the art for a number of years and numerous suggestions and proposals were made for solving the same. However, as far as is known, none of these suggestions was completely satisfactory and successful when carried out on a practical and industrial scale.

It has been discovered that the outstanding problem may be solved in a remarkably simple manner.

It is an object of the present invention to improve rechargeable batteries.

It is another object of the present invention to provide a novel and improved anti-reversal device for cells of rechargeable batteries.

It is a further object of the invention to provide a switching device responsive to the flow of reversed polarity current therethrough to permanently eliminate the defective cell from the battery of serially connected rechargeable cells.

It is also within contemplation of the invention to provide a polarized shorting fuse capable of being operated or "fired" by the flow of current therethrough in a predetermined direction.

The invention also contemplates a polarized shorting fust which is simple in structure, reliable in operation, and which may be readily manufactured and sold on a quantity production scale at a low cost.

Other and further objects and advantages will become apparent from the following description, taken in conjunction with the accompnaying drawing; in which FIG. 1 is an exploded longitudinal sectional view, having parts in elevation, showing a polarized shorting fuse embodying the invention, prior to its assembly;

FIG. 2 is a longitudinal sectional view illustrating the fuse shown in FIG. 1 in its assembled condition;

FIG. 3 is a similar view showing the device of FIGS. 1 and 2 after having been actuated, or "fired";

FIG. 4 is a simplified symbol for schematic representation of the device of the invention in circuit diagrams; and FIG. 5 is a circuit diagram of a battery comprising a plurality of serially connected rechargeable cells, each of said cells having a polarized shorting fuse connected across the same.

Broadly stated, according to the principles of the present invention, there is provided a semiconductor diode having a biased spring contact attached thereto by means of a low melting point solder. This device constitutes a polarized shorting switch or fuse one of which is connected across each of the serially connected rechargeable cells of the battery. While each of the several cells delivers discharge current to the common load, the devices remain inoperative. However, upon forced polarity reversal of any one of the cells, the diode of the corresponding device becomes conducting and, as a result of the heating effect of the current flowing therethrough, it will be quickly heated to a temperature where the low melting point solder will be fused. This will release the biased spring contact which will permanently short circuit the defective cell. In this connection, it is to be noted that for many applications, particularly for those involving batteries in remote or unattended locations, it may be preferable to permanently short circuit an individual cell at the time of initial polarity reversal in order to continue battery operation at reduced voltage.

Referring now to FIG. 1 of the drawing, illustrating a polarized shorting fuse 10 embodying the invention prior to its assembly, reference numeral 11 denotes a semiconductor chip having a p-n junction 12 previously generated therein. Regions 14 and 15 of the said chip are of p and n type conductivity, respectively. Part 16 is a solder preform for mechanical and electrical connection of semiconductor chip 11 to metallic base plate 17. Numeral 18 denotes a solder of relatively low melting point used to secure the shorter end of an L-shaped contact spring 19 to n region 15. A wire 20 is butt welded to base plate 17 and constitutes one of the electrical terminals of the device.

The subassembly just described is combined with a housing or packaging structure which comprises a cylindrical metal casing 21 having a flange at one end and a metal package egress tube 22 of small diameter at the center of its other end. Insulation 23 of suitable glass is interposed between the inner surface of casing 21 and the outer surface of egress tube 22, forming a glass-to-metal seal with said surfaces.

FIG. 2 is a sectional view of the assembled device in which semiconductor chip 11 has been soldered to base plate 17 and the hook-shaped end of spring 19 has been soldered to region 15 by solder 18 in the askew position shown in FIG. 1, then flexed by insertion of its other end into tube 22. Base plate 17 is welded to the flanged end of cylindrical casing 21 at 24, finally the entire package is hermetically sealed by welding spring 19 to tube 22, as indicated at 25. Conductor 20 and tube 22 constitute the two electrical terminals of the device.

FIG. 4 is a schematic representation of the device of the invention and FIG. 5 is a circuit diagram showing a battery comprising four serially connected rechargeable cells 26, 27, 28 and 29 and one device connected across each cell, the p-n junction of each device being so connected that its direction of current passage is from the negative to the positive terminal of the corresponding cell.

From the foregoing description the operation of the device will be readily understood by those skilled in the art. During normal discharge of a given cell, the device junction is reverse-biased and the conduction of current therethrough is insignificant. The junction is forward biased if forced cell reversal occurs in the cell across which it is connected at which time the device conducts substantially all of the load current. Under these conditions, heat generated at the junction will melt solder 18 in a very short time, allowing spring 19 snap into its "fired" position, shown in FIG. 3, electrically connecting terminals 20 and 22 at 30. The reversed cell is thus permanently shorted at a favorable time when the stored energy is at a low value, so that the remaining cells of the battery may continue delivering current.

There are certain design considerations which have to be considered in the manufacture of the polarized shorting fuse of the invention in order to accomplish the best results. While conventional semiconductors are generally designed to accomplish rapid heat withdrawal from the junction into a suitable heat sink, in the device of the invention it is desirable to retain most of the heat generated in the junction thereby to accomplish quick "firing" of the device upon cell reversal. This is accomplished by making the area of junction 12 small with respect to the load current and by making the thermal resistance of the device large. Also, it is preferred to suspend the device in the circuit by means of terminals 20 and 22, thereby further to increase thermal resistance of the unit, rather than following the conventional practice of having base 17 in intimate contact with a heat sink.

In a practical polarized shorting fuse embodying the invention and suitable for operation at ambient temperatures ranging from about −30° F. to +150° F. and at load currents ranging from 1 to 10 amperes, the following design considerations were observed:

Base 17 and casing 21 were made of iron or steel, preferably plated with a more noble metal, such as gold. Conductor 20 was copper and was butt welded to base 17. Preform 16 was 3 mils thick and was made of an alloy composed of 95% by weight of lead and 5% by weight of tin. To further increase thermal resistance of the package, preform 16 can be a narrow metallic presoldered annulus. Semiconductor chip 11 was of 3 ohm/cm. p-type germanium having junction 12 previously generated therein by alloying a 40 mil dot composed of 95% by weight of tin and 5% by weight of antimony to the germanium by heating in a hydrogen atmosphere at 537° C. for 12 minutes. Silicon having either a diffused or an alloyed junction is equally suitable and is required for operating temperatures above about 85° C. but is slower acting because of higher voltage of significant conduction.

Solder 18 is the residual tin-antimony of the alloying step reinforced by pure tin. A solder of this type will melt at approximately 450° F. If it is desired to have the device operate at a lower temperature, the said solder and also the alloying dot could be of indium while the use of lead and of lead alloys makes the device operate or "fire" at higher temperatures. The alloy dot should, of course, contain a suitable donor impurity, such as antimony, for example, in both cases. Spring 19 is preferably fabricated of an electrical spring alloy such as one composed of 99.5% by weight of Ag, 0.3% by weight Mg, and 0.27% by weight of Ni, which is sold under the name of Mallory D–63X and is characterized by excellent electrical conductivity and good solderability. There are, however, numerous conventional copper alloys available which possess the required electrical and spring properties.

Although the present invention has been disclosed in connection with a preferred embodiment thereof, variations and modifications may be resorted to by those skilled in the art without departing from the principles of the invention. Thus, instead of the described package of the so-called "top hat" type, other structures or encapsulations may be used with equal or similar results. All of these variations and modifications are considered to be within the true spirit and scope of the invention, as disclosed in the foregoing description and defined by the appended claims.

What is claimed is:

1. A polarized shorting fuse comprising a semiconductor junction having first and second regions, first and second terminals for said junction, a conductive path permanently connecting said first terminal to said first region, and a biased contact spring having one of its ends connected to said second terminal and having its other end solder-bonded to said second region whereby upon the passage of current through said junction in the forward direction the soldered bond will be fused liberating said biased spring for displacement into a position shorting said terminals.

2. A polarized shorting fuse comprising a semiconductor chip having first and second regions constituting a rectifier junction, first and second terminals respectively connected to said regions, the connection between one of said regions and the corresponding terminal being constituted by a resiliently deformed contact spring having one end permanently connected to said terminal and having its other end bonded to said region by a low melting point solder, said contact spring being stationary in the substantial absence of current flow therethrough and having its soldered end freed for displacement into a position bridging both terminals upon said solder being fused by the passage of current through said spring.

3. A polarized shorting fuse comprising a semiconductor chip having a rectifier junction formed therein, a metal casing including a base to which a first region of said chip is bonded constituting the first terminal of the fuse, a metal tube insulatedly supported in said casing constituting the second terminal of the fuse, and a biased contact spring having one of its ends permanently connected to said tube and having its other end bonded by a low melting point solder to a second region of said chip whereby upon the passage of current through said junction in the forward direction said solder will be fused freeing the corresponding end of the contact spring for displacement into a position where it engages said casing and directly connects said terminals.

4. A polarized shorting fuse comprising a semiconductor chip having first and second regions defining a rectifier junction, a terminal for each region, an electrical connection between each region and its corresponding terminal, one of said connections including a substantially L-shaped resiliently deformed contact spring having its longer end permanently secured to said terminal and having its shorter end solder-bonded to the corresponding region, said fuse being inoperative while said rectifier junction is reverse-biased and becoming operative upon said junction being forward biased when the passage of current therethrough will fuse the solder and release the end of the contact spring into a position permanently bridging said terminals.

5. A polarized shorting fuse comprising a semiconductor chip having first and second regions defining a rectifier junction, a tubular metal casing, a metal base to which said first region of the chip is bonded at one end of said casing and constituting the first terminal of the fuse, a metal tube insulatedly supported in the other end of said casing constituting the second terminal of said fuse, and a generally L-shaped contact spring having its shorter end solder-bonded to said second region and having its longer end resiliently deformed and soldered in said tube, said fuse being inoperative when connected across a source of potential in the non-conducting direction and being actuated when connected across a source of potential in the conducting direction whereby said solder-bonded end of the contact spring is freed for displacement into a position wherein it engages the casing and short circuits the terminals.

6. In combination with a rechargeable cell having terminals of opposed polarity, a polarized shorting fuse comprising a semiconductor chip having first and second regions defining a rectifier junction therebetween, first and second terminals respectively connected to said regions, the connection between one of said regions and the corresponding terminal being constituted by a resiliently deformed contact spring having one end permanently connected to said terminal and having its other end bonded to said region by a low melting point solder, the terminals of said fuse being so connected to those of the cell as to have the rectifier junction substantially non-conducting while the cell operates with normal polarity, whereby upon polarity reversal of the cell said junction will conduct and will fuse said solder freeing the corresponding end of the spring for displacement into a position short circuiting the cell.

7. In combination with a battery comprising a plurality of serially connected rechargeable cells each having terminals of opposed polarity; a polarized shorting fuse for each cell; said fuse comprising a semiconductor chip having first and second regions defining a rectifier junction therebetween, first and second terminals respectively connected to said regions, the connection between one of said regions and the corresponding terminal being constituted by a resiliently deformed contact spring having one end permanently connected to said terminal and having its other end bonded to said region by a low melting point solder; the terminals of said fuse being so connected to those of the cell with which it is associated as to have the rectifier junction substantially non-conducting while the cell discharges with normal polarity whereby upon polarity reversal of the said cell said junction will pass current which will fuse said solder freeing the corresponding end of the spring for displacement into a position short circuiting said cell.

No references cited.

MILTON O. HIRSHFIELD, *Primary Examiner.*